(12) United States Patent
Suzuki et al.

(10) Patent No.: US 11,024,159 B2
(45) Date of Patent: Jun. 1, 2021

(54) SERVER APPARATUS, INFORMATION PROCESSING METHOD, STORAGE MEDIUM AND METHOD OF PROVIDING DANGER INFORMATION

(71) Applicant: Toyota Jidosha Kabushiki Kaisha, Toyota (JP)

(72) Inventors: Keiko Suzuki, Tokyo (JP); Ko Koga, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 16/221,814

(22) Filed: Dec. 17, 2018

(65) Prior Publication Data

US 2019/0189002 A1 Jun. 20, 2019

(30) Foreign Application Priority Data

Dec. 18, 2017 (JP) .............................. JP2017-242123

(51) Int. Cl.
| | |
|---|---|
| *G08G 1/01* | (2006.01) |
| *G08G 1/0967* | (2006.01) |
| *G01C 21/36* | (2006.01) |
| *G10L 15/22* | (2006.01) |
| *B60W 40/09* | (2012.01) |
| *G10L 15/26* | (2006.01) |

(52) U.S. Cl.
CPC .......... *G08G 1/0112* (2013.01); *B60W 40/09* (2013.01); *G01C 21/3691* (2013.01); *G08G 1/0141* (2013.01); *G08G 1/096791* (2013.01); *G10L 15/22* (2013.01); *G10L 15/26* (2013.01); *G10L 2015/228* (2013.01)

(58) Field of Classification Search
CPC .......... G08G 1/0112; G08G 1/096791; G08G 1/0141; G08G 1/0962; G08G 1/096775; G01C 21/3696; G10L 15/22; G10L 15/26; G10L 2015/228; B60W 40/09
See application file for complete search history.

(56) References Cited

U.S. PATENT DOCUMENTS

| | | | | |
|---|---|---|---|---|
| 10,026,309 | B1 * | 7/2018 | Nepomuceno | G08G 1/163 |
| 10,317,240 | B1 * | 6/2019 | Di Pietro | G06N 20/00 |
| 2014/0306814 | A1 * | 10/2014 | Ricci | B60Q 9/00 |
| | | | | 340/425.5 |
| 2016/0027305 | A1 * | 1/2016 | Inaba | G08G 1/0112 |
| | | | | 340/905 |
| 2016/0061625 | A1 * | 3/2016 | Wang | G08G 1/0141 |
| | | | | 701/454 |

FOREIGN PATENT DOCUMENTS

JP 2016071492 A 5/2016

* cited by examiner

*Primary Examiner* — Marthe Y Marc-Coleman
(74) *Attorney, Agent, or Firm* — Dinsmore & Shohl LLP

(57) ABSTRACT

A server apparatus includes circuitry configured to acquire utterance information on a traveling location point, the utterance information being provided by occupants of a plurality of vehicles and derive a reason for danger near the traveling location point based on the acquired utterance information.

10 Claims, 11 Drawing Sheets

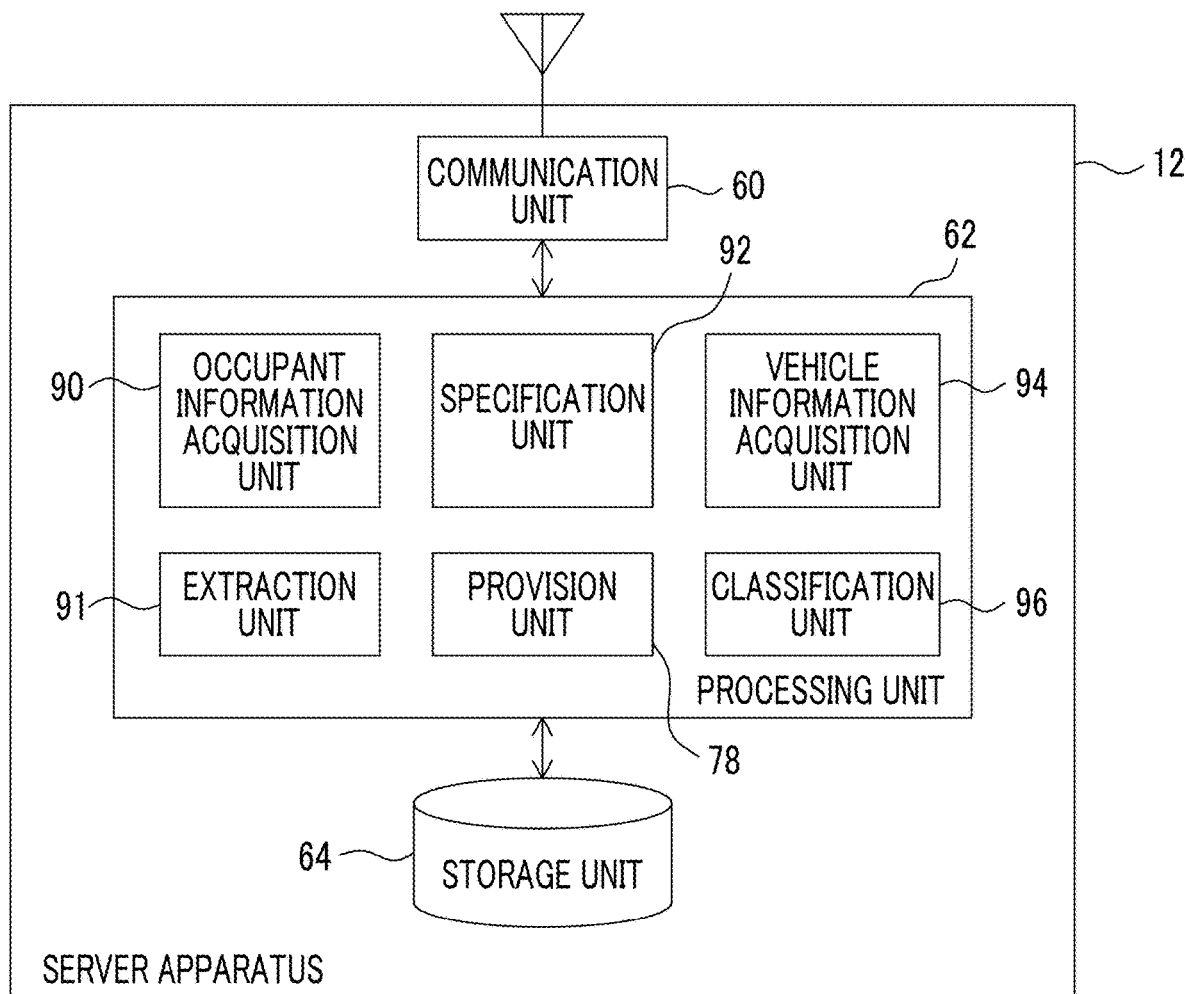

SERVER APPARATUS, INFORMATION PROCESSING METHOD, STORAGE MEDIUM AND METHOD OF PROVIDING DANGER INFORMATION

CROSS-REFERENCE TO RELATED APPLICATIONS

This application claims priority to Japanese Patent Application No. 2017-242123 filed on Dec. 18, 2017, which is incorporated herein by reference in its entirety including the specification, drawings and abstract.

BACKGROUND

1. Technical Field

The disclosure relates to a server apparatus for processing information acquired from a vehicle, an information processing method, a non-transitory computer-readable storage medium storing a data structure, and a method of providing danger information.

2. Description of Related Art

For example, Japanese Unexamined Patent Application Publication No. 2016-071492 (JP 2016-071492 A) discloses a system that compares vehicle information transmitted from n vehicle and vehicle information accumulated about accident and near misses that have occurred in the past to specify commonalities, estimates whether the accident or the like is occurred on the vehicle by environmental factors based on the commonalities, and notifies a driver of a location point where the accident or the like is likely to occur by reflecting the environmental factors in map information or the like of a car navigation system in a case where the accident or the like were occurred by the environmental factors.

SUMMARY

In the related art, it is not possible to notify a driver of a reason for danger of a location point where an accident or the like is likely to occur. Therefore, it is not possible to make the driver recognize what to pay attention to specifically in a case of traveling at the location point where the accident or the like is likely to occur.

Furthermore, in the related art, a determination is made that an accident/near miss has occurred in cases where a sudden braking is performed or an airbag is activated. However, a potentially dangerous location point where the accident may occur in the future may exist, although the sudden braking or the like has not been performed. It is desirable to specify such potentially dangerous location point.

Here, it is conceivable to specify the potentially dangerous location point by determining using threshold values obtained from sensor data of various vehicles, information on the Web, or the like. However, all road environments are specified as the potentially dangerous location point and an alerting is issued repeatedly and frequently in the above mentioned system; therefore, the system tends to be a very troublesome system for occupants.

The disclosure provides a server apparatus, an information processing method, a non-transitory computer-readable storage medium storing a data structure, and a method of providing danger information capable of acquiring information with higher convenience regarding a dangerous location point.

A first aspect of the disclosure relates to a server apparatus including circuitry. The circuitry is configured to acquire utterance information on a traveling location point, the utterance information being provided by occupants of a plurality of vehicles and derive a reason for danger near the traveling location point based on the acquired utterance information.

According to the first aspect of the disclosure, since the reason for the danger near the traveling location points is derived based on the utterance information related to the traveling location points of the occupants of the vehicles, the reason for the danger which cannot be grasped from traveling state of the vehicle can be derived. Therefore, it is possible to acquire more convenient information on the dangerous location point.

A second aspect of the disclosure relates to the server apparatus including circuitry. The circuitry is configured to acquire information on utterances or motions of occupants of a plurality of vehicles, extract a specific utterance or a specific motion repeated near a dangerous location point specified in advance from the acquired information on the utterances or the motions of the occupants of the vehicles, and specify a location point other than the dangerous location point, where the extracted specific utterance or the extracted specific motion is repeated, as a potentially dangerous location point based on the acquired information on the utterances or the motions of the occupants of the vehicles.

According to the second aspect of the disclosure, the potentially dangerous location point, which has some commonalities with the dangerous location point, where accident may occur in the future can be specified. Therefore, it is possible to acquire more convenient information on the dangerous location point.

A third aspect of the disclosure relates to the information processing method. The information processing method includes acquiring utterance information on a traveling location point, the utterance information being provided by occupants of a plurality of vehicles and deriving a reason for danger near the traveling location point based on the acquired utterance information.

A fourth aspect of the disclosure relates to the non-transitory computer-readable storage medium storing a data structure used in the server apparatus. The data structure includes information on a traveling location point of a vehicle and data about utterance information in association with the traveling location point. The server apparatus acquires utterance information on the traveling location point of occupants of a plurality of vehicles using the data and derives a reason for danger near the traveling location point based on the utterance information.

According to the fourth aspect of the disclosure, by deriving the reason for the danger near the traveling location points using the data about the utterance information in association with the traveling location points, the reason for the danger which cannot be grasped from traveling state of the vehicle can be derived. Therefore, it is possible to acquire more convenient information on the dangerous location point.

A fifth aspect of the disclosure relates to the non-transitory computer-readable storage medium storing the data structure used in the server apparatus. The data structure includes information on a dangerous location point and data about a specific utterance or a specific motion, which is associated with the dangerous location point and is repeated near the dangerous location point. The server apparatus acquires information on utterances or motions of occupants of a plurality of vehicles using the data, extracts the specific utterance or the specific motion repeated near the dangerous location point from the acquired information on the utterances or the motions of the occupants of the vehicles, and specifies a location point other than the dangerous location point, where the specific utterance or the specific motion is repeated, as a potentially dangerous location point based on the acquired information on the utterances or the motions of the occupants of the vehicles.

According to the fifth aspect of the disclosure, by using the data about the specific utterances or the specific motions, which are associated with the dangerous location point and are repeatedly performed near the dangerous location point, the potentially dangerous location point, which has some commonalities with the dangerous location point, where accident may occur in the future can be specified. Therefore, it is possible to acquire more convenient information on the dangerous location point.

A sixth aspect of the disclosure relates to the method of providing the danger information. The method includes acquiring utterance information on a traveling location point, the utterance information being provided by occupants of a plurality of vehicles and providing a reason for danger near the traveling location point derived based on the acquired utterance information, in association with the traveling location point.

According to the sixth aspect of the disclosure, since the reason for the danger near the traveling location points is derived based on the utterance information related to the traveling location points of the occupants of the vehicles, the reason for the danger which cannot be grasped from traveling state of the vehicle can be derived. Therefore, it is possible to provide more convenient information on the dangerous location point.

A seventh aspect of the disclosure relates to a method of providing danger information. The method includes acquiring information on utterances or motions of occupants of a plurality of vehicles, extracting a specific utterance or a specific motion repeated near a dangerous location point specified in advance from the acquired information on the utterances or the motions of the occupants of the vehicles, and providing information on a location point other than the dangerous location point, where the extracted specific utterance or the extracted specific motion is repeated, specified as a potentially dangerous location point based on the acquired information on the utterances or the motions of the occupants of the vehicles.

According to the seventh aspect of the disclosure, it is possible to provide information on the potentially dangerous location point, which has some commonalities with the dangerous location point, where accident may occur in the future. Therefore, it is possible to provide more convenient information on the dangerous location point.

According to the aspects of the disclosure, it is possible to acquire more convenient information on the dangerous location point.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is a block diagram showing a configuration of the server apparatus according to the fourth embodiment.

DETAILED DESCRIPTION OF EMBODIMENTS

First Embodiment

Figure 1:
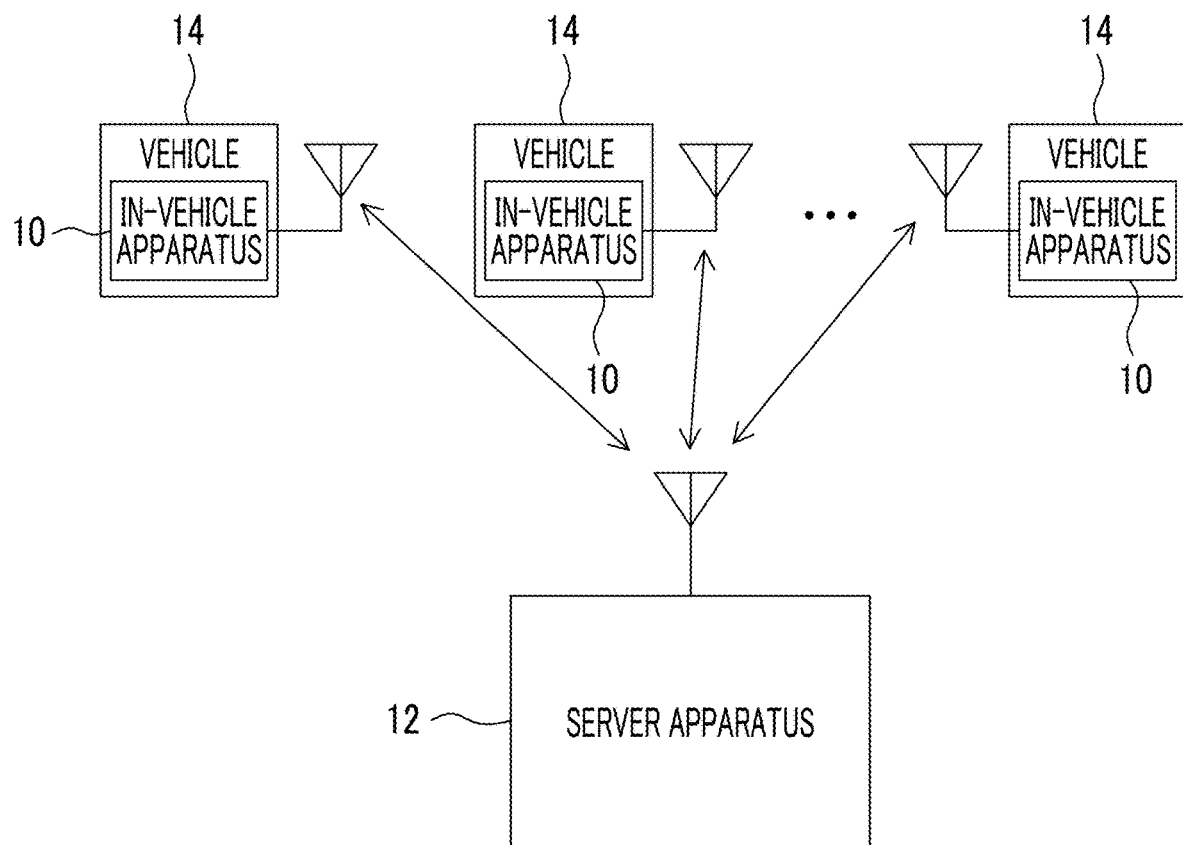
FIG. 1 is a block diagram showing a configuration of a vehicle system according to a first embodiment.

FIG. 1 is a block diagram showing a configuration of a vehicle system 1 according to a first embodiment. The vehicle system 1 includes a plurality of in-vehicle apparatuses 10 and a server apparatus 12. Three in-vehicle apparatuses 10 of the in-vehicle apparatuses 10 are shown in FIG. 1.

The in-vehicle apparatus 10 is mounted on a vehicle 14 which is an automobile. The in-vehicle apparatus 10 performs wireless communication with the server apparatus 12. The wireless communication standard is not particularly limited, and includes, for example, 3G (third generation mobile communication system), 4G (fourth generation mobile communication system) or 5G (fifth generation mobile communication system). The in-vehicle apparatus 10 may perform wireless communication with the server apparatus 12 via a base station (not shown). The server apparatus 12 functions, for example, as an information processing device installed in a data center processing big data transmitted from the in-vehicle apparatuses 10.

Figure 2:
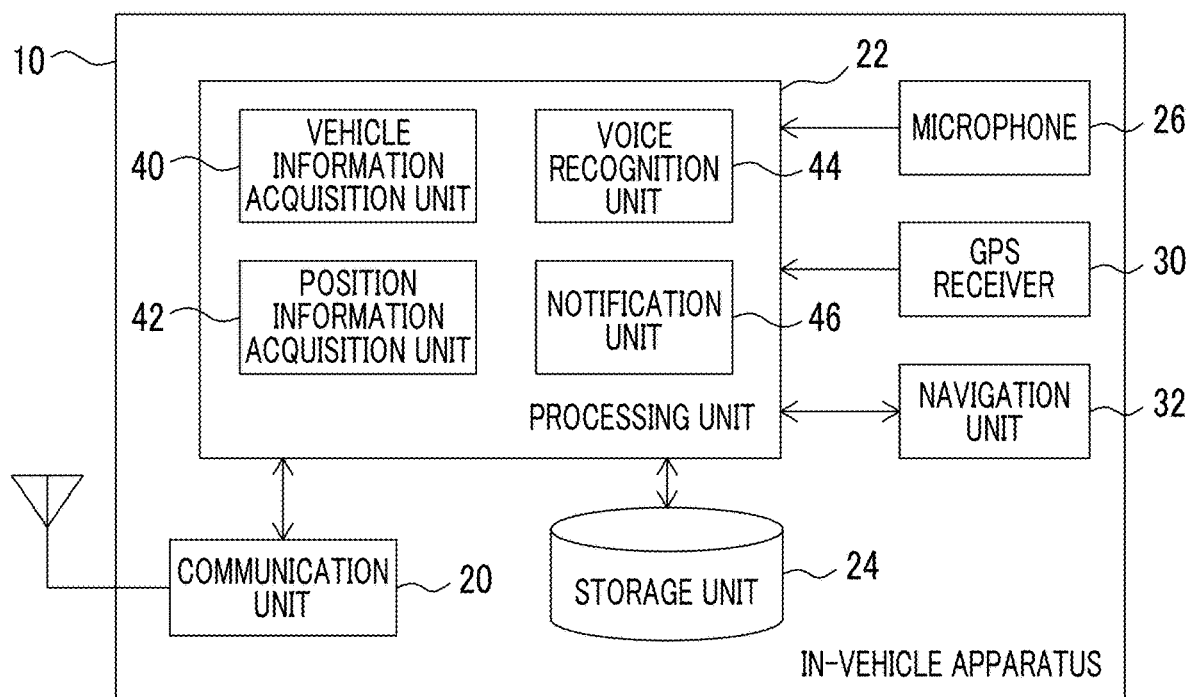
FIG. 2 is a block diagram showing a configuration of an in-vehicle apparatus of FIG. 1.

FIG. 2 is a block diagram showing the configuration in-vehicle apparatus 10 of FIG. 1. The in-vehicle apparatus 10 includes a communication unit 20, a processing unit 22, a storage unit 24, a microphone 26, a GPS (Global Positioning System) receiver 30, and a navigation unit 32. The processing unit 22 includes a vehicle information acquisition unit 40, a position information acquisition unit 42, a voice recognition unit 44, and a notification unit 46.

The microphone 26 is provided in a vehicle cabin of the vehicle 14 and acquires a voice in the vehicle cabin. The voice includes an utterance related to a traveling location point by an occupant of the vehicle 14. The microphone 26 outputs the acquired voice data to the processing unit 22.

The GPS receiver 30 receives a signal from a GPS satellite and derives a position of the vehicle 14. The position of the vehicle 14 includes latitude and longitude. The GPS receiver 30 outputs the position information on the vehicle 14 to the processing unit 22.

The vehicle information acquisition unit 40 periodically acquires vehicle information on the vehicle from various sensors (not shown) and outputs the vehicle information to the communication unit 20. The vehicle information includes, for example, speed information, deceleration information, brake operation amount information, accelerator operation amount information, steering angle information, and the like. Acquired time information may be attached to the vehicle information and the time information when the server apparatus 12 receives the vehicle information may be regarded as the acquired time information.

A frequency at which the vehicle information acquisition unit 40 acquires the vehicle information can be appropriately regulated by experiments or the like so as to be able to specify a sudden braking and a sudden steering, which will be described later, and may be set, for example, from several times to a dozen times per second. The frequency at which the vehicle information acquisition unit 40 acquires the vehicle information may vary depending on a type of vehicle information.

The position information acquisition unit 42 acquires the position information from the GPS receiver 30 and outputs the position information to the communication unit 20. The acquired time information may be attached to the position information and the time information when the server apparatus 12 receives the position information may be regarded as the acquired time information. The frequency at which the position information acquisition unit 42 acquires the position information can be appropriately regulated by experiments or the like.

The voice recognition unit 44 recognizes the occupant's utterance based on the voice acquired by the microphone 26 in the vehicle cabin. The voice recognition unit 44 outputs utterance information, which is a voice recognition result, to the communication unit 20. The utterance information includes, for example, text data. The acquired time information may be attached to the utterance information and the time information when the server apparatus 12 receives the utterance information may be regarded as the acquired time information.

The communication unit 20 performs wireless communication with the server apparatus 12. The communication unit 20 periodically transmits the vehicle information acquired by the vehicle information acquisition unit 40, the position information acquired by the position information acquisition unit 42, and the utterance information output from the voice recognition unit 44, to the server apparatus 12. Information for identifying the vehicle 14 as a transmission source is attached to the above-mentioned information.

Figure 3:
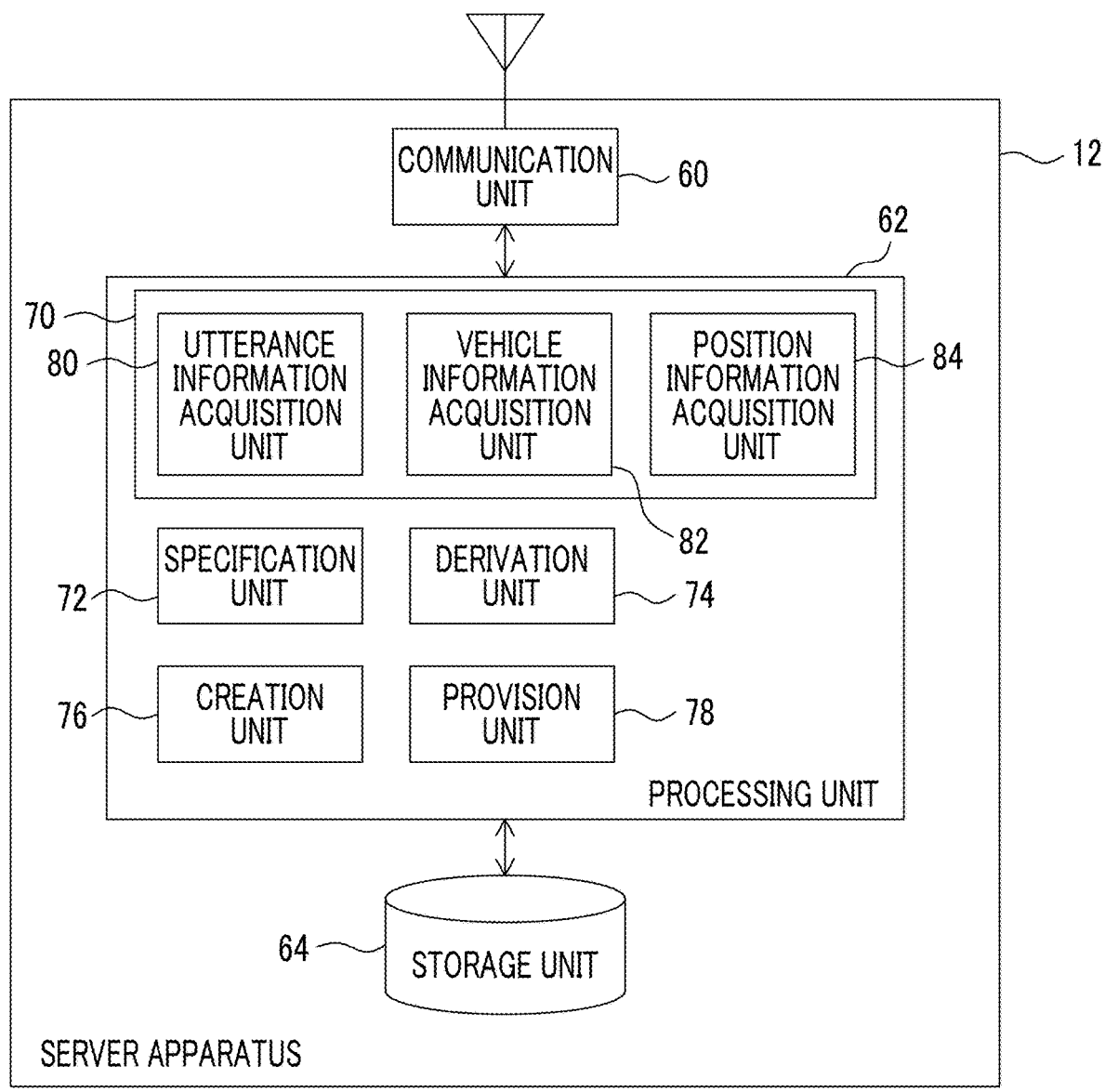
FIG. 3 is a block diagram showing a configuration of a server apparatus of FIG. 1.

FIG. 3 is a block diagram showing a configuration of the server apparatus 12 of FIG. 1. The server apparatus 12 includes a communication unit 60, a processing unit 62, and a storage unit 64. The processing unit 62 includes an acquisition unit 70, a specification unit 72, a derivation unit 74, a creation unit 76, and a provision unit 78.

The communication unit 60 performs wireless communication with the communication unit 20 of the in-vehicle apparatuses 10. The communication unit 60 receives the vehicle information, the position information and the utterance information from the communication unit 20 of the in-vehicle apparatuses 10. The communication unit 60 outputs the received information to the processing unit 62.

The acquisition unit 70 includes an utterance information acquisition unit 80, a vehicle information acquisition unit 82, and a position information acquisition unit 84. The utterance information acquisition unit 80 acquires the utterance information received by the communication unit 60.

The vehicle information acquisition unit 82 acquires the vehicle information received by the communication unit 60. The position information acquisition unit 84 acquires the position information received by the communication unit 60. For each vehicle 14 which is the transmission source, the acquisition unit 70 associates the vehicle information with the position information and the utterance information having the pieces of the time information which are acquired by the in-vehicle apparatus 10 and are closer to each other. That is, the vehicle information, the position information near the location point where the vehicle information has been acquired, and the utterance information near the location point indicated by the position information are associated with each other. The acquisition unit 70 causes the storage unit 64 to store the vehicle information, the information on the traveling location point in association with the vehicle information, and data about the utterance information in association with the traveling location point.

The specification unit 72 specifies a location point indicated by the position information in association with the vehicle information as a dangerous location point candidate in a case where the specification unit 72 specifies that a state of the vehicle 14 is a predetermined traveling state based on the vehicle information acquired by the acquisition unit 70. The specification unit 72 specifies the dangerous location point based on the dangerous location point candidate. More specifically, in a case where the predetermined number or more of the dangerous location point candidates that can be regarded as the same location point are specified, the specification unit 72 specifies the dangerous location point candidate as the dangerous location point. For example, the dangerous location point candidates within a radius of several meters can be regarded as the same location point. The predetermined number can be appropriately regulated by experiments or the like. The specification unit 72 specifies a plurality of dangerous location points and causes the storage unit 64 to store information on the specified dangerous location points.

The predetermined traveling state is a traveling state different from a normal traveling state and includes, for example, a traveling state in which pedestrians and the like are avoided at a low speed, a traveling state in which the sudden braking is applied, a traveling state in which the vehicle travels at a speed exceeding the speed limit of the road, a traveling state in which the sudden steering is performed, or the like.

The derivation unit 74 derives a reason for danger near the dangerous location point, which is the traveling location point of the vehicle 14, for each dangerous location point based on the utterance information on the dangerous location point acquired by the acquisition unit 70. The utterance information on the dangerous location point is utterance information in association with the position information near the dangerous location point. That is, it can be considered that the storage unit 64 stores information on the dangerous location point and data about the utterance information in association with the dangerous location point. The derivation unit 74 causes the storage unit 64 to store the derived reason for the danger near the dangerous location point.

The creation unit 76 creates a warning message based on the reason for the danger derived by the derivation unit 74 for each dangerous location point. The creation unit 76 causes the created warning message to associate with the information on the dangerous location point and to store in the storage unit 64.

The provision unit 78 provides the information on the dangerous location point and the warning message to the vehicles 14 via the communication unit 60.

In a case where the acquisition unit 70 does not acquire the utterance information on the dangerous location point corresponding to the derived reason for the danger for a predetermined period for each dangerous location point, the provision unit 78 distributes a deletion instruction for the information on the dangerous location point and the warning message to the vehicles 14 via the communication unit 60. In this case, the reason is that there is a possibility that the reason for the danger has disappeared. The predetermined period can be appropriately regulated by experiments or the like, for example, and may be several weeks.

Figure 4:
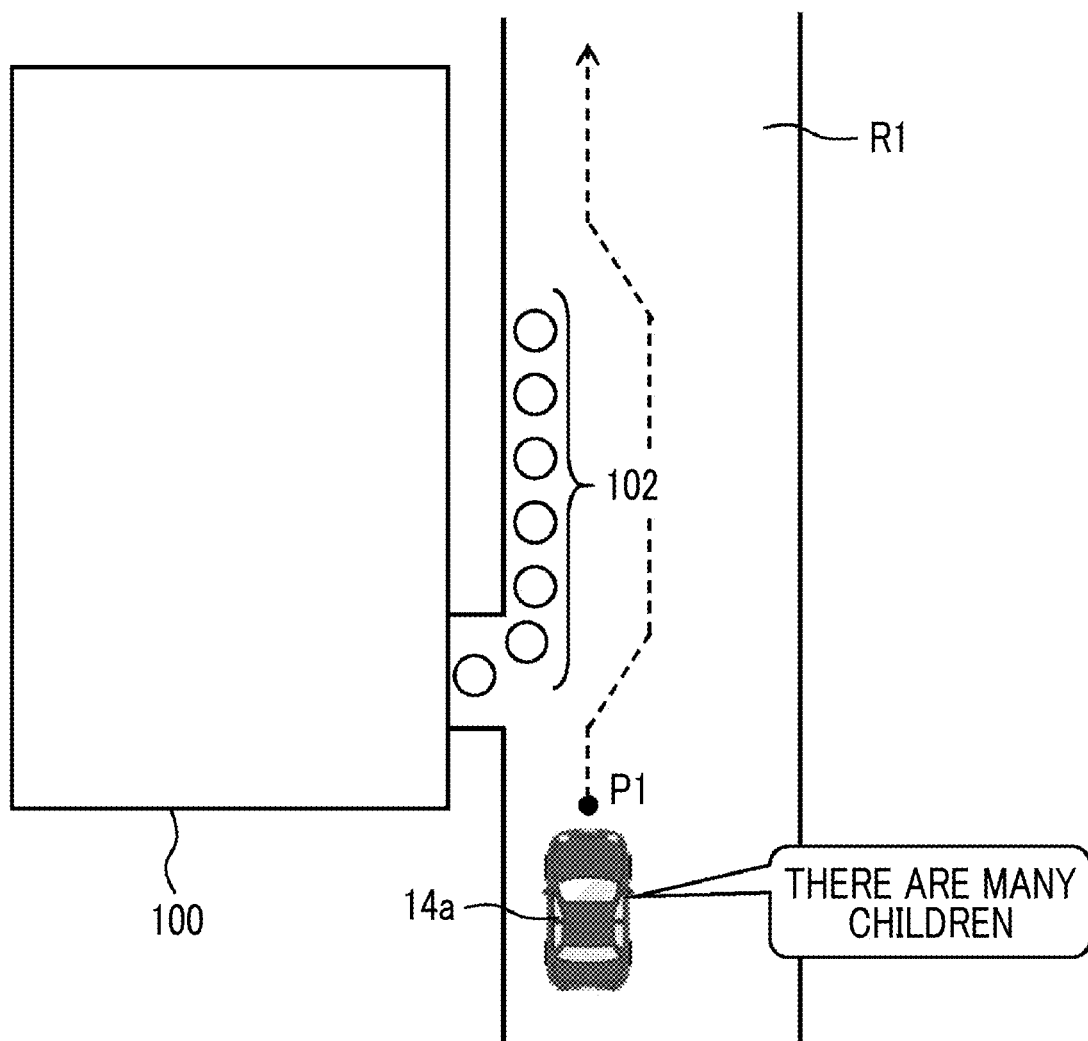
FIG. 4 is a view for describing a first example of a traveling state of the vehicle including the in-vehicle apparatus of FIG. 2.

Next, an example of deriving the reason for the danger will be described. FIG. 4 is a view for describing a first example of a traveling state of the vehicle 14a including the in-vehicle apparatus 10 of FIG. 2.

The vehicle 14a is traveling on a road R1 passing near a school 100. There is no sidewalk on the road R1. A plurality of pedestrians 102 is walking toward the school 100 on the road R1. The driver of the vehicle 14a utters, for example, "there are many children" near a location point P1, operates the brake to lower the speed, steers and drives at a low speed avoiding the pedestrians 102.

The specification unit 72 specifies that the vehicle 14a is in the traveling state avoiding pedestrians or the like at a low speed based on the speed, the brake operation amount and the steering angle of the vehicle 14a. The specification unit 72 specifies the location point P1 as the dangerous location point in a case where the predetermined number or more of the vehicles 14 are in the traveling state avoiding pedestrians or the like at the low speed near the location point P1.

The derivation unit 74 derives the reason for the danger near the dangerous location point P1 such as "there are many pedestrians" based on the utterance information on the dangerous location point P1 such as "there are many children" by the vehicle 14a and the utterance information on the dangerous location point P1, such as "there are many people" and "dangerous for children", by other vehicles 14 (not shown).

The creation unit 76 creates the warning message including the reason for the danger such as "there are many pedestrians, be careful" based on the reason for the dangers. In a case where the time information in which a plurality of pieces of utterance information on the dangerous location point P1 is acquired is, for example, around 8 o'clock, the creation unit 76 may create the warning message including the time information in which the utterance information on the dangerous location point P1 is acquired such as "there are many pedestrians, please avoid time zones around 8 o'clock".

Figure 5:
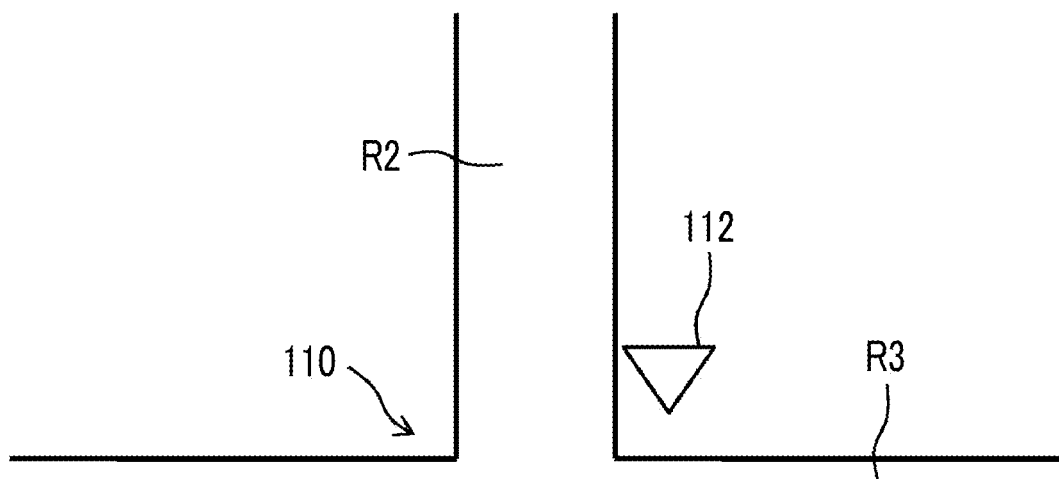
FIG. 5 is a view for describing a second example of the traveling state of the vehicle including the in-vehicle apparatus of FIG. 2.

FIG. 5 is a view for describing a second example of the traveling state of the vehicle 14b including the in-vehicle apparatus 10 of FIG. 2. At an intersection 110, a road R2 and a road R3 intersect. The road R2 is a road where a temporary stop sign 112 is located in front of the intersection 110 and the road R3 is a priority road without the temporary stop sign 112.

The vehicle 14b is traveling on the road R2 toward the intersection 110. It is assumed that the temporary stop sign 112 is hard to visually recognize by the driver of the vehicle 14b due to an obstacle or the like and cannot be visually recognized by a driver of a vehicle smaller than the vehicle 14b. The driver of the vehicle 14b recognizes the temporary stop sign 112 near the location point P2 just before the intersection 110, performs the sudden braking, for example, and utters "a sign is hard to see".

The specification unit 72 specifies that the vehicle 14b is in the traveling state in which the sudden braking is performed based on the speed, the deceleration and the brake operation amount of the vehicle 14b. The specification unit 72 specifies the location point P2 as the dangerous location point in a case where the predetermined number or more of the vehicles 14 are in the traveling state in which the sudden braking is performed near the location point P2.

The derivation unit 74 derives the reason for the danger near the dangerous location point P2 such as "a sign is hard to see" based on the utterance information on the dangerous location point P2 such as "a sign is hard to see" by the vehicle 14b and the utterance information on the dangerous location point P2, such as "a sign is invisible" and "was there a sign?", by the other vehicles 14 (not shown).

The creation unit 76 creates the warning message such as "there is a road sign" based on the reason for the danger. The creation unit 76 may create the warning message including the reason for the danger such as "a road sign is hard to see" based on the reason for the danger. By the warning message, it is possible to alert the driver of the vehicle for which it is hard to visually recognize the temporary stop sign 112 as well as the driver of the vehicle for which it is not possible to visually recognize the temporary stop sign 112.

As a third example of the traveling state of the vehicle 14 including the in-vehicle apparatus 10 of FIG. 2, an example in which the other vehicles travel on a road, the speeds of the vehicles exceeding the speed limit, will be described. Examples of such roads include a straight road with no signal and a nice view.

The vehicle 14 travels beyond the speed limit along the traveling flow of the other vehicles. The driver of the vehicle 14 utters, for example, "Everyone is fast".

The specification unit 72 specifies that the vehicle 14 is in the traveling state in which the vehicle travels at a speed exceeding the speed limit of the road based on the speed of the vehicle 14 and the speed limit of the road. The speed limit can be specified from map data or the like. In a case where the predetermined number or more vehicles are in the traveling state in which the vehicle travels at the speed exceeding the speed limit of the road near a location point, the specification unit 72 specifies the location point as the dangerous location point.

The derivation unit 74 derives the reason for the danger near the dangerous location point such as "Speeds of other vehicles are high" based on the utterance information on the location point such as "everyone is fast". The creation unit 76 creates the warning message, such as "the speeds of other vehicles are high", based on the reason for the danger.

Referring back to FIG. 2, in the in-vehicle apparatus 10, the communication unit 20 receives the information on the dangerous location point and the warning message from the server apparatus 12. The processing unit 22 causes the storage unit 24 to store the information on the dangerous location point and the warning message received by the communication unit 20. The notification unit 46 causes the navigation unit 32 to notify the driver of the information on the dangerous location point and the warning message stored in the storage unit 24.

In a case where a position of the vehicle 14 is closed to the dangerous location point, the navigation unit 32 displays the warning message about the dangerous location point on the map with letters, images or the like, and outputs it by voice.

The navigation unit 32 may notify the driver in advance of the dangerous location point and the warning message in a case where a route for traveling guidance is set and the route passes via the dangerous location point. Since the driver can grasp the reason for the danger of the dangerous location point by the warning message, it is possible to make the driver determine whether or not to travel at the dangerous location point based on the reason for the danger.

In a case where the warning message received by the communication unit 20 is, for example, "there is a road sign", the notification unit 46 may notify the driver of the warning message by projecting a virtual image emphasizing the road sign on the windshield of the vehicle 14 via the head-up display (not shown). The virtual image projected on the windshield is displayed so as to overlap with a real image ahead of the vehicle, and it is possible to alert the driver to the presence of the road sign.

The above-mentioned configuration can be realized by a CPU (Central Processing Unit) of any computer, a memory, and other LSI (Large Scale Integration) in terms of hardware, and is realized by a program or the like in terms of software; however, in this case, functional blocks realized by cooperation of the hardware and the software are drawn. Therefore, it is understood by those skilled in the art that the functional blocks can be realized in various forms by hardware alone, software alone, or a combination thereof.

As described above, according to the embodiment, since the reason for the danger near the traveling location points is derived based on the utterance information related to the traveling location points of the occupants of the vehicles 14, the reason for danger which cannot be grasped from the traveling state of the vehicles 14 can be derived. Therefore, it is possible to acquire more convenient information on the dangerous location point where accident or the like is likely to occur.

In addition, since the dangerous location point is specified based on the vehicle information on the vehicle 14 and the reason for the danger near the dangerous location point is derived based on the utterance information on the dangerous location point, a new dangerous location point which is not widely known can be specified with the reason for the danger.

In addition, since the warning message is created based on the derived reason for the danger and the information on the dangerous location point and the warning message are provided to the vehicles 14, it is possible to appropriately alert the drivers of the vehicles 14. Therefore, it is possible to make the drivers recognize what to pay attention to specifically in a case of traveling at the dangerous location point where an accident or the like is likely to occur.

In addition, in a case where the utterance information on the dangerous location point corresponding to the derived reason for the danger is not acquired for the predetermined period, the deletion instruction for the information on the dangerous location point and the warning message is distributed to the vehicles 14; therefore, it is possible to appropriately respond even in a case where the reason for the danger has disappeared due to changes in a road condition of the dangerous location point.

Second Embodiment

In a second embodiment, it is different from the first embodiment to derive the reason for the danger near the dangerous location point specified in advance. Hereinafter, differences from the first embodiment will be mainly described.

Figure 6:
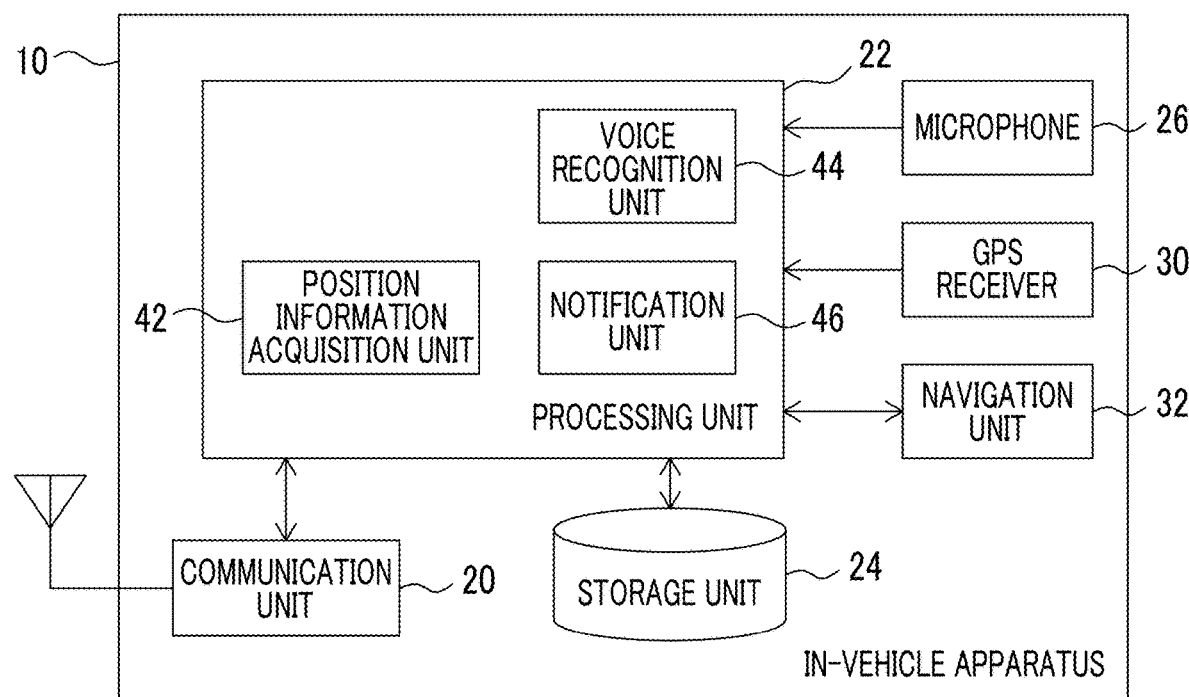
FIG. 6 is a block diagram showing a configuration of the in-vehicle apparatus according to the second embodiment.

FIG. 6 is a block diagram showing a configuration of the in-vehicle apparatus 10 according to the second embodiment. The processing unit 22 is different from the one in the first embodiment in that the processing unit 22 does not include the vehicle information acquisition unit. The storage unit 24 stores information on a plurality of dangerous location points specified in advance. The dangerous location points include an accident black spot and can be acquired from the Internet or the like. The information on the dangerous location points may be appropriately updated.

Based on the position information acquired by the position information acquisition unit 42 and the information on the dangerous location point stored in the storage unit 24, the voice recognition unit 44 recognizes the occupant's utterance including an utterance related to the dangerous location point based on the voice acquired by the microphone 26 in the vehicle cabin in a case where the position of the vehicle 14 is near the dangerous location point. The voice recognition unit 44 outputs the utterance information on the dangerous location point as the voice recognition result to the communication unit 20. The Information on the dangerous location points is attached to the utterance information on the dangerous location points. The communication unit 20 transmits the utterance information on the dangerous location points to the server apparatus 12.

Figure 7:
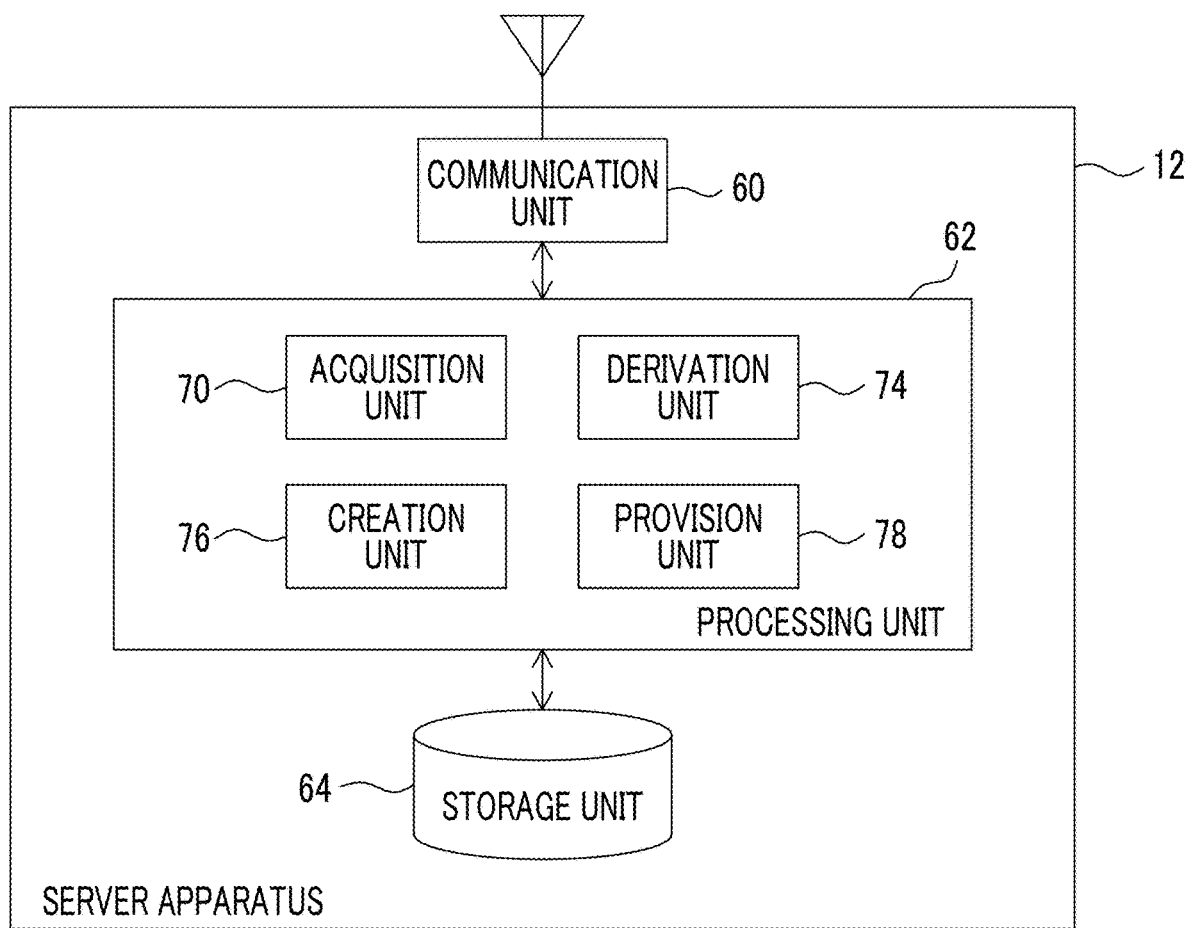
FIG. 7 is a block diagram showing a configuration of the server apparatus according to the second embodiment.

FIG. 7 is a block diagram showing a configuration of the server apparatus 12 according to the second embodiment. The processing unit 62 is different from the one in the first embodiment in that the processing unit 62 does not include the specification unit and the acquisition unit 70 does not include the utterance information acquisition unit, the vehicle information acquisition unit, and the position information acquisition unit.

The communication unit 60 receives the utterance information on the dangerous location points from the communication unit 20 of the in-vehicle apparatus 10. The acquisition unit 70 acquires the utterance information on the dangerous location points received by the communication unit 60. The acquisition unit 70 causes the storage unit 64 to store the information on the dangerous location points and the data about the utterance information in association with the dangerous location points. The processing of the derivation unit 74, the creation unit 76, and the provision unit 78 are the same as those of the first embodiment.

As described above, according to the embodiment, since the reason for the danger near the dangerous location points including the accident black spot is derived based on the utterance information related to the dangerous location points specified in advance, the reason for danger which cannot be grasped from the traveling state of the vehicle 14 can be derived with a configuration simpler than the first embodiment.

In the same manner as the first embodiment, the voice recognition unit 44 of the in-vehicle apparatus 10 may perform voice recognition irrespective of the position of the vehicle 14, and the communication unit 20 may transmit the position information acquired by the position information acquisition unit 42 and the utterance information output from the voice recognition unit 44 to the server apparatus 12. In this case, the storage unit 64 of the server apparatus 12 stores the information on the dangerous location points specified in advance. The derivation unit 74 derives the reason for the danger near the dangerous location points based on the utterance information on the dangerous location points. In this modified example, the configuration of the in-vehicle apparatus 10 can be simplified and the degree of freedom of the configuration of the vehicle system 1 can be improved.

Third Embodiment

In a third embodiment, a specific utterance and a specific motion repeatedly performed by the occupants of the vehicles 14 at the dangerous location point specified in advance are learned, and a potentially dangerous location point where the specific utterance or the specific motion are repeatedly performed is newly specified. Hereinafter, differences from the second embodiment will be mainly described.

Figure 8:
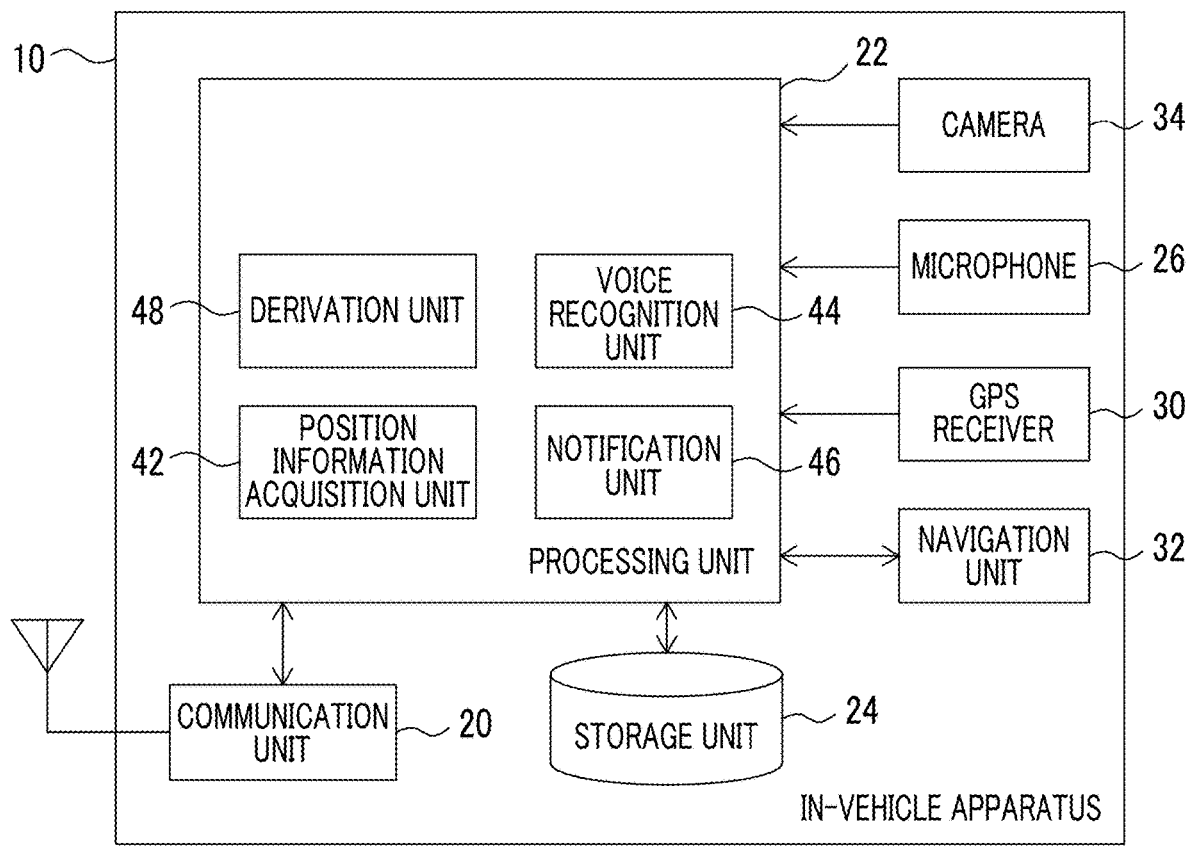
FIG. 8 is a block diagram showing a configuration of the in-vehicle apparatus according to a third embodiment.

FIG. 8 is a block diagram showing a configuration of the in-vehicle apparatus 10 according to the third embodiment. In addition to the configuration of the second embodiment, the in-vehicle apparatus 10 further includes a camera 34. In addition to the configuration of the second embodiment, the processing unit 22 further includes a derivation unit 48.

The camera 34 is provided in the vehicle cabin of the vehicle 14, and the occupants in the vehicle cabin are imaged by the camera 34. The occupants include a driver and a passenger of a passenger seat. The camera 34 outputs a captured image data to the processing unit 22.

Based on the position information acquired by the position information acquisition unit 42 and the information on the dangerous location point specified in advance stored in the storage unit 24, the derivation unit 48 derives information on the motion of the occupants of the vehicle 14 based on the image data output from the camera 34 in the case where the position of the vehicle 14 is near the dangerous location point. The motion of the occupants includes eyes or mouth movement, head movement, upper body movement, hand movement, and the like. The information on the motion may be represented by the feature quantity of the image. The information on the dangerous location point is attached to the information on the motion. The communication unit 20 transmits the utterance information and the motion related to the dangerous location point to the server apparatus 12.

Figure 9:
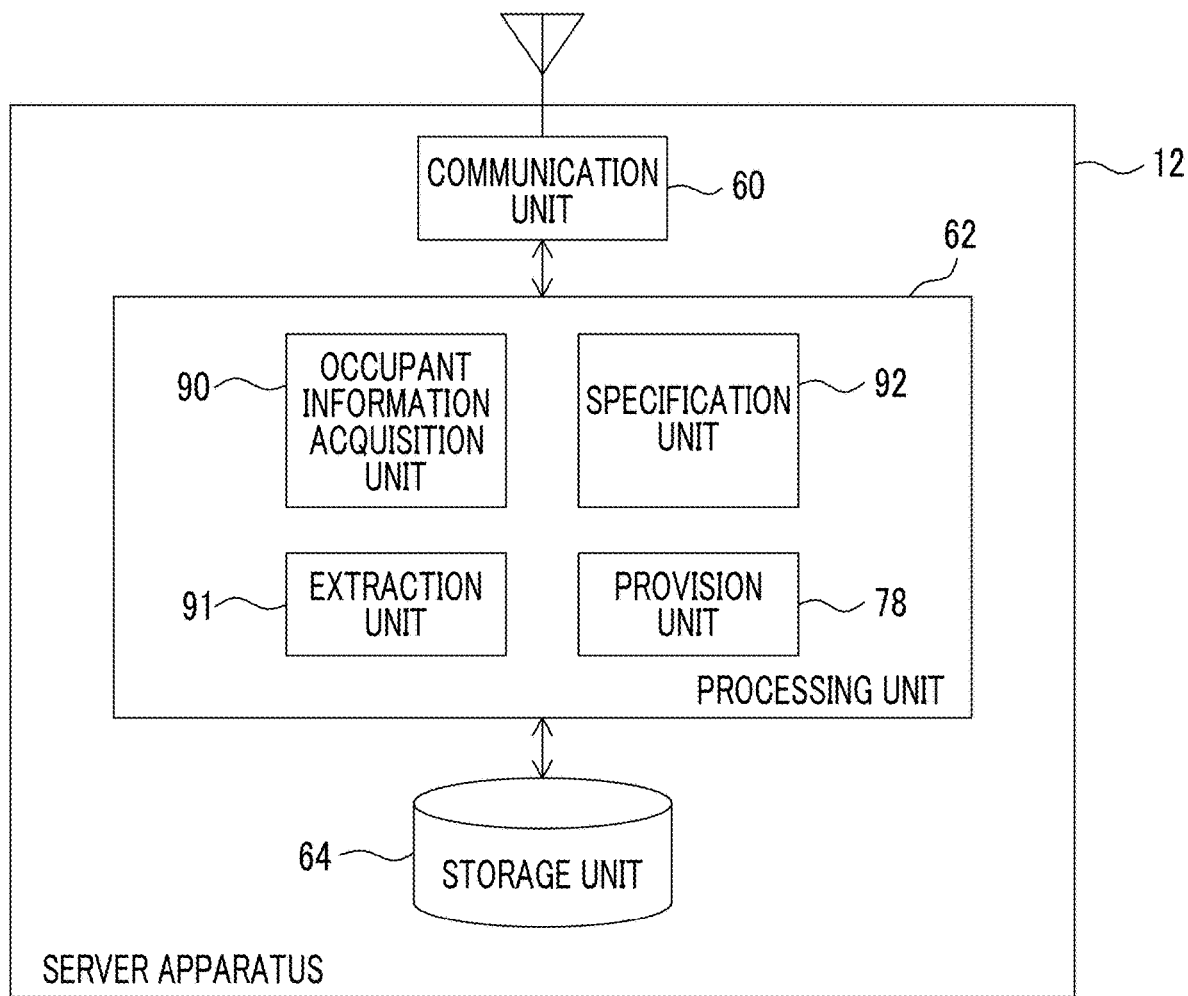
FIG. 9 is a block diagram showing the configuration of the server apparatus according to the third embodiment.

FIG. 9 is a block diagram showing the configuration of the server apparatus 12 according to the third embodiment. The processing unit 62 includes an occupant information acquisition unit 90, an extraction unit 91, a specification unit 92, and a provision unit 78.

The communication unit 60 receives the utterance information and the motion related to the dangerous location point from the communication unit 20 of the in-vehicle apparatuses 10. The occupant information acquisition unit 90 acquires the utterance information and the motion related to the dangerous location point of the occupants of the vehicles 14 received by the communication unit 60.

The extraction unit 91 extracts the specific utterance and the specific motion repeatedly performed near the dangerous location point from the information on the utterance and the motion related to the dangerous location point of the occupants of the vehicles 14 acquired by the occupant information acquisition unit 90. The extraction unit 91 extracts an utterance that is performed the predetermined number of times or more as the specific utterance and a motion that is performed the predetermined number of times or more as the specific motion. The extraction unit 91 extracts a plurality of specific utterances and a plurality of specific motions. The predetermined number of times can be appropriately regulated by experiments or the like. The extraction unit 91 causes the storage unit 64 to store the information on the dangerous location point and data about the specific utterance and the specific motion in association with the dangerous location point.

The specific utterances include the utterances in a case of sensing danger, for example, the specific utterances are assumed to include not only "Dangerous", "It's hard to see", or the like, but also utterances which cannot be assumed in advance.

The specific motions include a habit in a case of sensing danger, for example, the specific motions are assumed to include not only motions, such as closing eyes and turning head, but also motions which cannot be assumed in advance.

The specification unit 92 specifies a location point other than the dangerous location point, where the specific utterances or the specific motions extracted by the extraction unit 91 are repeatedly performed, as the potentially dangerous location point based on the utterance information and the motions of the occupants of the vehicles 14 acquired by the occupant information acquisition unit 90. The specification unit 92 specifies a location point other than the dangerous location point, where the specific utterance or the specific motion is performed the predetermined number of times or more as the potentially dangerous location point. The specification unit 92 can specify a plurality of potentially dangerous location points. The location point where the specific utterance or the specific motion is repeatedly performed is assumed to have some commonalities with the dangerous location point. Therefore, at the potentially dangerous location points, accident may occur in the future.

The provision unit 78 provides information on the potentially dangerous location points specified by the specification unit 92 to the vehicles 14 via the communication unit 60.

Referring back to FIG. 8, in the in-vehicle apparatus 10, the communication unit 20 receives the information on the potentially dangerous location point from the server apparatus 12. The processing unit 22 causes the storage unit 24 to store the information on the potentially dangerous location point received by the communication unit 20. The notification unit 46 notifies the driver of the information on the potentially dangerous location point received by the communication unit 20 via the navigation unit 32.

The navigation unit 32 displays the potentially dangerous location point on the map with icons or the like. In a case where the position of the vehicle 14 is close to the potentially dangerous location point, the navigation unit 32 may output by voice that the vehicle 14 is approaching the potentially dangerous location point. The navigation unit 32 may notify the driver in advance of the potentially dangerous location point in a case where a route for traveling guidance is set and the route passes via the potentially dangerous location point.

As described above, according to the embodiment, the specific utterance and the specific motion which are repeatedly performed near the dangerous location point are extracted from the utterance information or the motions of the occupants of the vehicles 14, a location point other than the dangerous location point where the extracted specific utterance or the extracted specific motion is repeatedly performed is specified as the potentially dangerous location point. The potentially dangerous location point, which has some commonalities with the dangerous location point, where accident may occur in the future can be specified. Therefore, it is possible to acquire more convenient information on a location point where accident or the like is likely to occur.

In addition, since the specific utterance and the specific motion repeatedly performed near the dangerous location point specified in advance are extracted, it is possible to make the specific utterance and the specific motion to include even utterances and motions that cannot be assumed in advance. Therefore, it is possible to specify a wider range of the potentially dangerous location points.

In addition, since information on the specified potentially dangerous location point is provided to the vehicles 14, it is possible to appropriately alert the drivers of the vehicles 14.

In addition, since utterance information and the motion of the passenger in the passenger seat of the vehicle 14 is also used to specify the potentially dangerous location point, it is also possible to specify the potentially dangerous location point which cannot be specified from the driver's utterance and motion.

Fourth Embodiment

In a fourth embodiment, it is different from the third embodiment that the potentially dangerous location point is specified for each type of driving characteristics of the driver and information on the potentially dangerous location point specified for each type of the driving characteristics of the driver is provided to the driver. Hereinafter, differences from the third embodiment will be mainly described.

Figure 10:
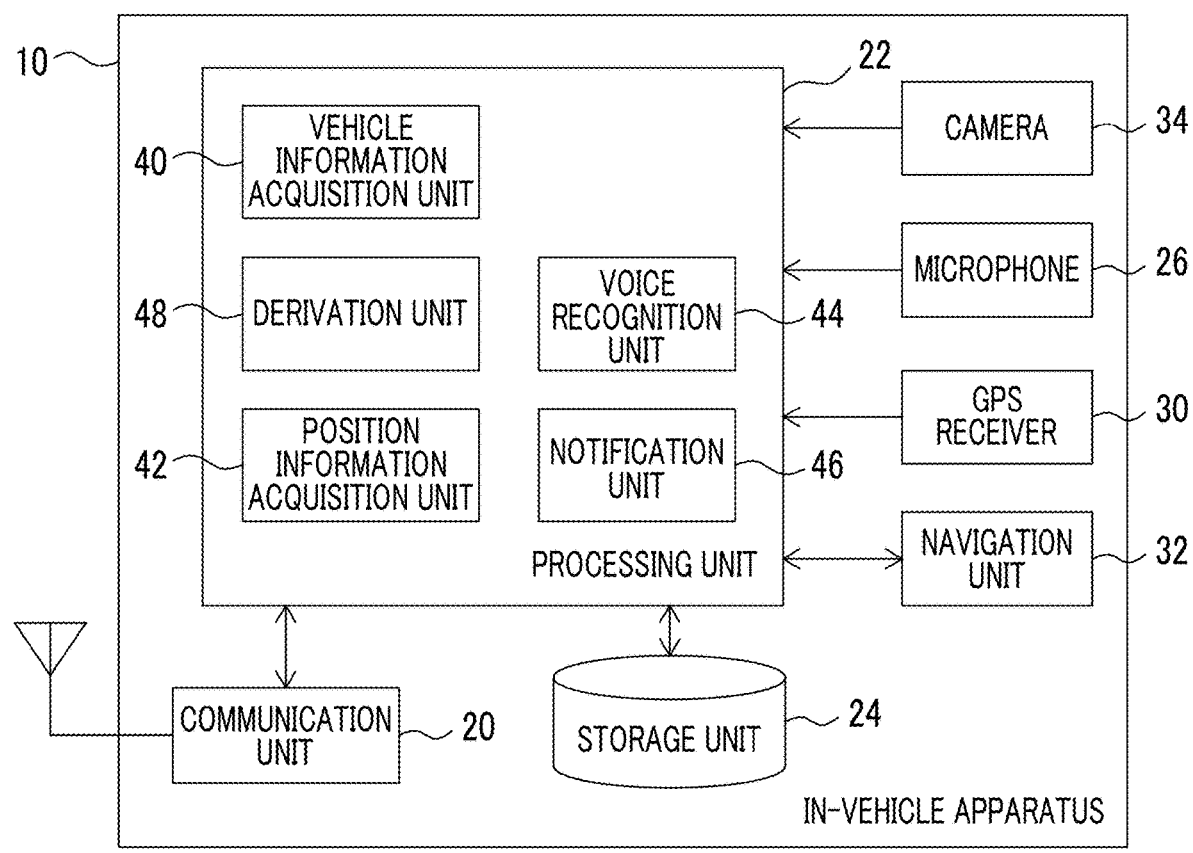
FIG. 10 is a block diagram showing a configuration of the in-vehicle apparatus according to a fourth embodiment.

FIG. 10 is a block diagram showing a configuration of the in-vehicle apparatus 10 according to the fourth embodiment. In addition to the configuration of the third embodiment, the processing unit 22 further includes the vehicle information acquisition unit 40. The function of the vehicle information acquisition unit 40 is the same as that of the first embodiment.

The communication unit 20 transmits the utterance information and the motion related to the dangerous location point and the vehicle information acquired by the vehicle information acquisition unit 40 to the server apparatus 12.

FIG. 11 is a block diagram showing a configuration of the server apparatus 12 according to the fourth embodiment. In addition to the configuration of the third embodiment, the processing unit 62 further includes a vehicle information acquisition unit 94 and a classification unit 96.

The communication unit 60 receives the utterance information and the motion related to the dangerous location point and the vehicle information from the communication unit 20 of the in-vehicle apparatus 10. The vehicle information acquisition unit 94 acquires the vehicle information on the vehicles 14 received by the communication unit 60.

The classification unit 96 classifies the driving characteristics of the drivers of the each vehicle 14 based on the vehicle information acquired by the vehicle information acquisition unit 94. Classification can be performed using well-known techniques. For example, in a case where a sudden acceleration, a sudden stop, a sudden steering wheel operation, and an excessive speed are frequent, the classification unit 96 may classify the driver of each vehicle 14 into a type that has a high possibility of causing an accident. The classification unit 96 may also classify the driving characteristics using utterance information as well. For example, in a case where an utterance expressing an impatience, an utterance criticizing another vehicle, a self-centered utterance are frequent, the more the classification unit 96 may classify the driver of each vehicle 14 into the type that has a higher possibility of causing an accident.

The potentially dangerous location point is specified for each type of the driving characteristics of the driver. For example, in a case where the location point where the specific utterance or the specific motion is repeatedly performed is specified as the potentially dangerous location point, the specification unit 92 specifies the potentially dangerous location point for the type of the driver who performs the specific utterance or the specific motion. The specification unit 92 may specify all the potentially dangerous location points with respect to a type that has the highest possibility of causing an accident regardless of whether or not the driver of type has performed the specific utterance or the specific motion.

For example, it is assumed that the specification unit 92 specified 100 potentially dangerous location points P1 to P100. In addition, it is assumed that the classification unit 96 classified the driving characteristics of the driver into four types A, B, C, and D. Type A is a type that performs the safest driving, type B is a type that is more likely to cause an accident than type A, type C is a type that is more likely to cause an accident than type B, and Type D is a type most likely to cause an accident.

For the type A, for example, 50 potentially dangerous location points P1 to P50 are specified. For the type B, for example, 60 potentially dangerous location points P1, P3, . . . , P100 are specified. Similarly, for example, 80 potentially dangerous location points are specified for the type C. Similarly, for example, 100 potentially dangerous location points are specified for the type D. There are the potentially dangerous location points that are common to all types and there may also be the potentially dangerous location points that are specified for a single type.

The provision unit 78 provides the vehicle 14 with information on the potentially dangerous location point specified for the type of the driving characteristics of the driver of the vehicle 14. For example, the provision unit 78 provides information on 50 potentially dangerous location points P1 to P50 specified for the type A to the vehicle 14 of the driver classified as the type A. Therefore, the potentially dangerous location points provided to the vehicles 14 are different from each other for each type of driver.

As described above, according to the embodiment, the driving characteristics of the driver of the vehicle 14 are classified and the information on the potentially dangerous location points specified for the type of driving characteristics of the driver is provided to the vehicle 14; therefore, it is possible to provide appropriate information on a more potentially dangerous location point suitable for the driving characteristics the driver.

For example, it is possible that the potentially dangerous location point, which is not dangerous for the type A driver performing a safe driving; however, is potentially dangerous for the type D driver that has high possibility of causing an accident, is not provided to the type A driver; therefore, it is possible to reduce a notification of the potentially dangerous location point so as to less bother the type A driver.

The above disclosure has been described based on the embodiments. It is understood by those skilled in the art that the embodiments are merely examples and various modifications are possible for combinations of the respective elements and the respective processing processes, and that such modifications are also within the scope of the disclosure.

For example, by combining the first embodiment with the third or fourth embodiment, the dangerous location point specified based on the vehicle information of the vehicles 14 may be used instead of the dangerous location point specified in advance as the dangerous location point of the third or fourth embodiment. In this case, the reason for the danger for the dangerous location point and the potentially dangerous location point may be derived. In this modified example, in a case of traveling at the potentially dangerous location point, it is possible to make the driver recognize what to pay attention to specifically in consideration of the respective effects of the combined embodiments.

By combining the second embodiment and the third or fourth embodiment, the reason for the danger for the dangerous location point and the potentially dangerous location point may be derived. Also in this modified example, in a case of traveling at the potentially dangerous location point, it is possible to make the driver recognize what to pay attention to specifically in consideration of the respective effects of the combined embodiments.

In the third and fourth embodiments, the in-vehicle apparatus 10 may not include the camera 34 and the derivation unit 48. In this case, the specification unit 92 specifies the potentially dangerous location point without using the information on the motion of the occupant. In this modified example, the configuration of the vehicle system 1 can be simplified.

In the third and fourth embodiments, the in-vehicle apparatus 10 may not include the microphone 26 and the voice recognition unit 44. In this case, the specification unit 92 specifies the potentially dangerous location point without using the utterance information of the occupant. Also in this modified example, the configuration of the vehicle system 1 can be simplified.

In the server apparatus according to the first aspect of the disclosure, the circuitry may be configured to acquire vehicle information on the vehicles and position information in association with the vehicle information, specify a location point indicated by the position information in association with the vehicle information as a dangerous location point candidate in a case where a state of the vehicles is specified as a predetermined traveling state based on the acquired vehicle information, specify a dangerous location point based on the dangerous location point candidate and derive a reason for danger near the dangerous location point based on the acquired utterance information on the dangerous location point.

In the server apparatus according to the first aspect of the disclosure, the circuitry may be configured to create a warning message based on the derived reason for the danger and provide information on the dangerous location point and the warning message to the vehicles.

In the server apparatus according to the first aspect of the disclosure, the circuitry may be configured to distribute a deletion instruction for the information on the dangerous location point and the warning message to the vehicles in a case where the utterance information on the dangerous location point is not acquired for a predetermined period, the utterance information corresponding to the derived reason for the danger.

In the server apparatus according to the second aspect of the disclosure, the circuitry may be configured to provide information on the specified potentially dangerous location point to the vehicles.

In the server apparatus according to the second aspect of the disclosure, the circuitry may be configured to acquire vehicle information on the vehicles, and classify driving characteristics of drivers of the vehicles based on the acquired vehicle information. The circuitry may be configured to specify the potentially dangerous location point for each type of the driving characteristics of the drivers and provide the vehicles with information on the potentially dangerous location point specified for the type of the driving characteristics of the drivers of the vehicles.

In the information processing method according to the third aspect of the disclosure, the information processing method may further include acquiring information on utterances or motions of occupants of the vehicles, extracting a specific utterance or a specific motion repeated near a dangerous location point specified in advance from the acquired information on the utterances or the motions of the occupants of the vehicles, and specifying a location point other than the dangerous location point, where the extracted specific utterance or the extracted specific motion is repeated, as a potentially dangerous location point based on the acquired information on the utterances or the motions of the occupants of the vehicles.

What is claimed is:

1. A server apparatus comprising circuitry configured to acquire utterance information on a traveling location point, the utterance information being provided by occupants of a plurality of vehicles,
derive a reason for danger near the traveling location point based on the acquired utterance information,
acquire vehicle information on the plurality of vehicles and position information in association with the vehicle information,
specify a location point indicated by the position information in association with the vehicle information as a dangerous location point candidate in a case where a state of the plurality of vehicles is specified as a predetermined traveling state based on the acquired vehicle information,
specify a dangerous location point based on the dangerous location point candidate,
derive a reason for danger near the dangerous location point based on the acquired utterance information on the dangerous location point,
create a warning message based on the derived reason for danger,
provide information on the dangerous location point and the warning message to the plurality of vehicles, and
distribute a deletion instruction for the information on the dangerous location point and the warning message to the plurality of vehicles in a case where the utterance information on the dangerous location point is not acquired for a predetermined period, the utterance information corresponding to the derived reason for danger.

2. A server apparatus comprising circuitry configured to acquire information on utterances and motions of occupants of a plurality of vehicles,
extract a specific utterance and a specific motion repeated near a dangerous location point specified in advance from the acquired information on the utterances and the motions of the occupants of the plurality of vehicles, and
specify a location point other than the dangerous location point, where the extracted specific utterance and the extracted specific motion is repeated, as a potentially dangerous location point based on the acquired information on the utterances and the motions of the occupants of the plurality of vehicles.

3. The server apparatus according to claim 2, wherein the circuitry is configured to provide information on the specified potentially dangerous location point to the plurality of vehicles.

4. The server apparatus according to claim 3, wherein the circuitry is configured to acquire vehicle information on the plurality of vehicles,
classify driving characteristics of drivers of the plurality of vehicles based on the acquired vehicle information,
specify the potentially dangerous location point for each type of the driving characteristics of the drivers, and
provide the plurality of vehicles with information on the potentially dangerous location point specified for the type of the driving characteristics of the drivers of the plurality of vehicles.

5. An information processing method comprising:
acquiring utterance information on a traveling location point, the utterance information being provided by occupants of a plurality of vehicles;
deriving a reason for danger near the traveling location point based on the acquired utterance information,
acquiring vehicle information on the plurality of vehicles and position information in association with the vehicle information,
specifying a location point indicated by the position information in association with the vehicle information as a dangerous location point candidate in a case where a state of the plurality of vehicles is specified as a predetermined traveling state based on the acquired vehicle information,
specifying a dangerous location point based on the dangerous location point candidate,
deriving a reason for danger near the dangerous location point based on the acquired utterance information on the dangerous location point,
creating a warning message based on the derived reason for danger,
providing information on the dangerous location point and the warning message to the plurality of vehicles, and
distributing a deletion instruction for the information on the dangerous location point and the warning message to the plurality of vehicles in a case where the utterance information on the dangerous location point is not acquired for a predetermined period, the utterance information corresponding to the derived reason for danger.

6. The information processing method according to claim 5, further comprising:
acquiring information on utterances or motions of occupants of the plurality of vehicles;
extracting a specific utterance or a specific motion repeated near a dangerous location point specified in advance from the acquired information on the utterances or the motions of the occupants of the plurality of vehicles; and
specifying a location point other than the dangerous location point, where the extracted specific utterance or the extracted specific motion is repeated, as a potentially dangerous location point based on the acquired information on the utterances or the motions of the occupants of the plurality of vehicles.

7. A non-transitory computer-readable storage medium storing a data structure used in a server apparatus, the data structure comprising information on a traveling location point of a vehicle and data about utterance information in association with the traveling location point,
wherein the server apparatus acquires utterance information on the traveling location point, the utterance information being provided by occupants of a plurality of vehicles, by using the data,
derives a reason for danger near the traveling location point based on the utterance information,
acquires vehicle information on the plurality of vehicles and position information in association with the vehicle information,
specifies a location point indicated by the position information in association with the vehicle information as a dangerous location point candidate in a case where a state of the plurality of vehicles is specified as a predetermined traveling state based on the acquired vehicle information,
specifies a dangerous location point based on the dangerous location point candidate,
derives a reason for danger near the dangerous location point based on the acquired utterance information on the dangerous location point,
creates a warning message based on the derived reason for danger,
provides information on the dangerous location point and the warning message to the plurality of vehicles, and
distributes a deletion instruction for the information on the dangerous location point and the warning message to the plurality of vehicles in a case where the utterance information on the dangerous location point is not acquired for a predetermined period, the utterance information corresponding to the derived reason for danger.

8. A non-transitory computer-readable storage medium storing a data structure used in a server apparatus, the data structure comprising information on a dangerous location point and data about a specific utterance and a specific motion which is associated with the dangerous location point and is repeated near the dangerous location point,
wherein the server apparatus acquires information on utterances and motions of occupants of a plurality of vehicles using the data, extracts the specific utterance and the specific motion repeated near the dangerous location point from the acquired information on the utterances and the motions of the occupants of the plurality of vehicles, and specifies a location point other than the dangerous location point, where the specific utterance and the specific motion is repeated, as a potentially dangerous location point based on the acquired information on the utterances and the motions of the occupants of the plurality of vehicles.

9. A method of providing danger information, the method comprising:
acquiring utterance information on a traveling location point, the utterance information being provided by occupants of a plurality of vehicles;
providing a reason for danger near the traveling location point derived based on the acquired utterance information, in association with the traveling location point,
acquiring vehicle information on the plurality of vehicles and position information in association with the vehicle information,
specifying a location point indicated by the position information in association with the vehicle information as a dangerous location point candidate in a case where a state of the plurality of vehicles is specified as a predetermined traveling state based on the acquired vehicle information,
specifying a dangerous location point based on the dangerous location point candidate,
deriving a reason for danger near the dangerous location point based on the acquired utterance information on the dangerous location point,
creating a warning message based on the derived reason for danger, providing information on the dangerous location point and the warning message to the plurality of vehicles, and distributing a deletion instruction for the information on the dangerous location point and the warning message to the plurality of vehicles in a case where the utterance information on the dangerous location point is not acquired for a predetermined period, the utterance information corresponding to the derived reason for danger.

10. A method of providing danger information, the method comprising:

acquiring information on utterances and motions of occupants of a plurality of vehicles;

extracting a specific utterance and a specific motion repeated near a dangerous location point specified in advance from the acquired information on the utterances and the motions of the occupants of the plurality of vehicles; and providing information on a location point other than the dangerous location point, where the extracted specific utterance and the extracted specific motion is repeated, specified as a potentially dangerous location point based on the acquired information on the utterances and the motions of the occupants of the plurality of vehicles.

* * * * *